(12) United States Patent
George et al.

(10) Patent No.: US 8,644,354 B2
(45) Date of Patent: Feb. 4, 2014

(54) METHODS AND SYSTEMS FOR AUTOMATICALLY REGISTERING A MOBILE PHONE DEVICE WITH ONE OR MORE MEDIA CONTENT ACCESS DEVICES

(75) Inventors: T. Sahaya George, TamilNadu (IN); Balamuralidhar Maddali, Chennai (IN); Sampath Raman, Tirunelveli (IN); Naman Patel, Gujarat (IN); Sankaran Raman, Chennai (IN); Praveen Prabhaharan, Hosur (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 600 days.

(21) Appl. No.: 12/872,130

(22) Filed: Aug. 31, 2010

(65) Prior Publication Data
US 2011/0086619 A1    Apr. 14, 2011

Related U.S. Application Data

(63) Continuation-in-part of application No. 12/578,911, filed on Oct. 14, 2009.

(51) Int. Cl.
*H04J 3/12*   (2006.01)

(52) U.S. Cl.
USPC .................................. 370/522; 725/74; 700/1

(58) Field of Classification Search
None
See application file for complete search history.

(56) References Cited

U.S. PATENT DOCUMENTS

| 8,042,155 | B1 | 10/2011 | Chang et al. |
| 2005/0239399 | A1 | 10/2005 | Karabinis |
| 2008/0056216 | A1 | 3/2008 | Zimmerman et al. |
| 2009/0052870 | A1 | 2/2009 | Marsh et al. |
| 2009/0298535 | A1* | 12/2009 | Klein et al. ................ 455/556.1 |
| 2009/0319894 | A1 | 12/2009 | Markiewicz et al. |
| 2010/0083338 | A1 | 4/2010 | Chiang et al. |

* cited by examiner

*Primary Examiner* — Kevin C Harper

(57) ABSTRACT

An exemplary method includes a media content access device detecting a request provided by a mobile phone device to register the mobile phone device with the media content access device, registering the mobile phone device with the media content access device in response to the detected request, and automatically registering the mobile phone device with one or more additional media content access devices within the local area network. Corresponding methods and systems are also described.

22 Claims, 13 Drawing Sheets

METHODS AND SYSTEMS FOR AUTOMATICALLY REGISTERING A MOBILE PHONE DEVICE WITH ONE OR MORE MEDIA CONTENT ACCESS DEVICES

RELATED APPLICATIONS

This application is a continuation-in-part of presently pending U.S. patent application Ser. No. 12/578,911 filed Oct. 14, 2009, entitled SYSTEMS AND METHODS FOR WIRELESS LOCAL AREA NETWORK BASED CONTROL OF A SET-TOP BOX DEVICE, which is hereby incorporated by reference in its entirety.

BACKGROUND INFORMATION

Set-top box devices have provided users of such devices with access to a large number and variety of media content programs and services. For example, a user may choose to experience a variety of broadcast television programs, pay-per-view services, video-on-demand programming, and audio programming via a set-top box device.

The large number of media content choices offered by providers can make it difficult for a user of a set-top box device to find and select desired media content. On-screen program guides have alleviated this problem to some degree. However, an on-screen program guide occupies at least a portion of a display screen associated with the set-top box device and thereby impairs a user's ability to view a full rendition of a media content instance on the display screen while navigating through the program guide.

Moreover, it is often cumbersome for a user to control how a set-top box device operates. For example, a traditional remote control device configured to control a set-top box device often includes a plethora of buttons, some of which are never utilized by the user. Hence, it is often difficult for a user to locate and select a sequence of buttons that may be required to perform a particular set-top box device operation.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
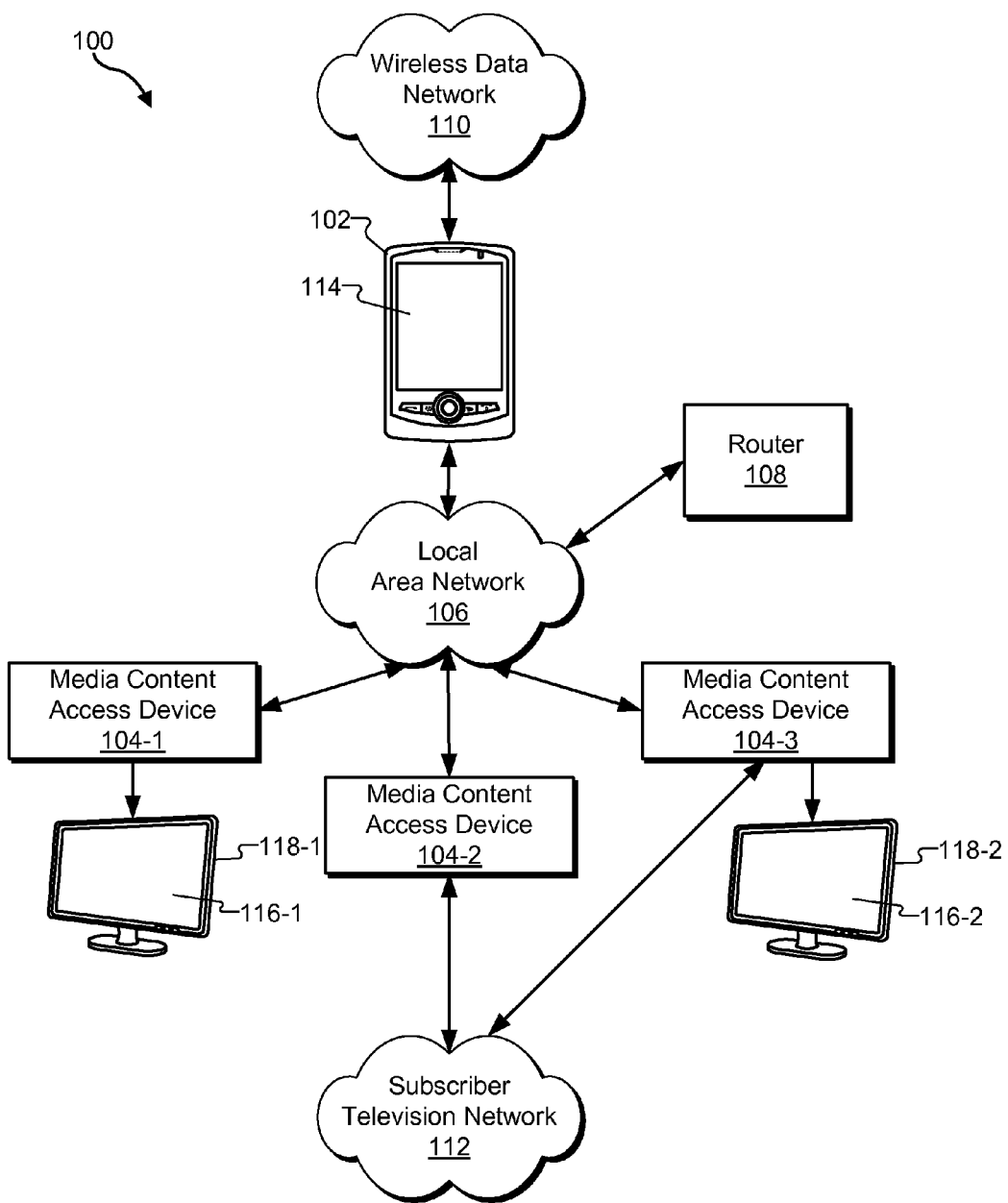
FIG. 1 illustrates an exemplary media content access device control system according to principles described herein.

Exemplary systems and method for automatically registering a mobile phone device with one or more media content access devices are described herein. As described in more detail below, a media content access device may detect a request provided by a mobile phone device to register the mobile phone device with the media content access device. The media content access device may register the mobile phone device with the media content access device in response to the detected request. The media content access device may also automatically register the mobile phone device with one or more additional media content access devices within a local area network. The mobile phone device may then be used to selectively control the media content access device and the one or more additional media content access devices by way of one or more communication channels included in the local area network.

As will be described in more detail below, the systems and methods described herein may facilitate an efficient, secure, and/or customizable media content access device control experience for a user. For example, a user may be able to use a mobile phone device to selectively control a plurality of media content access devices included in a local area network after registering the mobile phone device with only one of the media content access devices. Additional advantages of the systems and methods described herein are described in more detail below.

As used herein, "registering a mobile phone device with a media content access device" and "registering a media content access device with a mobile phone device" will be used interchangeably to refer to a process used to enable selective control of the media content access device by the mobile phone device. Hence, a mobile phone device registered with a media content access device may be used to direct the media content access device to perform one or more operations, such as, but not limited to, displaying a particular media content instance, changing a media content channel, fast forwarding through media content, rewinding or going back within media content, adjusting (e.g., increasing, decreasing, or muting) a volume level associated with a presentation of media content, scheduling a recording of media content, purchasing "on-demand" media content, flagging media content as a "favorite" or as something that the user dislikes, rating media content, selecting one or more options available within a program guide or other menu structure, powering the media content access device on or off, and/or any other operation associated with the media content access device as may serve a particular implementation. References to a media content access device "automatically registering" a mobile phone device with one or more additional media content access devices may include any action taken by the media content access device that results in and/or contributes to the mobile phone device being registered with the one or more additional media content access devices.

As used herein, "media content" may refer generally to any content accessible via a media content access device. The term "media content instance" will be used herein to refer to any television program, on-demand media program, pay-per-view media program, broadcast media program (e.g., broadcast television program), IPTV media content, advertisement (e.g., commercial), video, movie, song, video game, image, photograph, sound, or any segment, component, or combination of these or other forms of media content that may be viewed or otherwise experienced by a user.

FIG. 1 illustrates an exemplary media content access device control system 100 (or simply "system 100"). While an exemplary system 100 is shown in FIG. 1, the components and configuration of system 100 illustrated in FIG. 1 are not limiting. Additional or alternative components and/or configurations may be used in other embodiments. In certain alternative embodiments, for example, one or more of the components shown in FIG. 1 may be omitted or combined.

As shown in FIG. 1, a mobile phone device 102 and a plurality of media content access devices 104 (e.g., media content access devices 104-1 through 104-3) may be configured to communicate one with another by way of a local area network 106. Media content access devices 104 (or simply "access devices 104") may each include, but is not limited to, a set-top box device, a digital video recording ("DVR") device, a multi-room DVR device, a media content processing device, a personal computer, a gaming device, a television device, and/or any device configured to perform one or more of the processes and/or operations described herein.

In some examples, local area network 106 may include a wireless local area network. To illustrate, mobile phone device 102 and access devices 104 may communicate by way of a router 108, which in certain embodiments may include a Wi-Fi router within a local Wi-Fi network (e.g., a home Wi-Fi network). Router 108 may alternatively include any other type of wireless local area network router as may serve a particular implementation. Mobile phone device 102 may be communicatively coupled to router 108 by way of a wireless connection. Access devices 104 may each be communicatively coupled to router 108 by way of a wired and/or a wireless connection.

As shown in FIG. 1, mobile phone device 102 may be further configured to communicate with one or more other computing devices (e.g., one or more other mobile phone devices, servers, etc.) by way of a wireless data network 110 (e.g., a mobile phone voice or data network). Likewise, one or more of access devices 104 (e.g., access devices 104-2 and 104-3) may be further configured to communicate with one or more other computing devices by way of a subscriber television network 112, including requesting and/or receiving data representative of media content (e.g., broadcast, multicast, narrowcast, and/or on-demand media content) and/or other data content over subscriber television network 112. In some examples, the one or more access devices 104 may access subscribed television network 112 by way of local area network 106.

As shown in FIG. 1, display screens may be associated with mobile phone device 102 and one or more access devices 104.

For example, display screen 114 may be a part of or otherwise associated with mobile phone device 102 and display screens 116-1 and 116-2 (collectively referred to as "display screens 116") may be associated with access devices 104-1 and 104-3. Display screens 116 may be a part of display devices 118-1 and 118-2 (e.g., a television, computer monitor, etc.) connected to access devices 104-1 and 104-3, respectively. In some alternative examples, a display screen may be integrated into an access device. Media content and/or one or more graphical user interfaces may be displayed on one or more of display screens 114 and 116, as will be described in more detail below.

Figure 2:
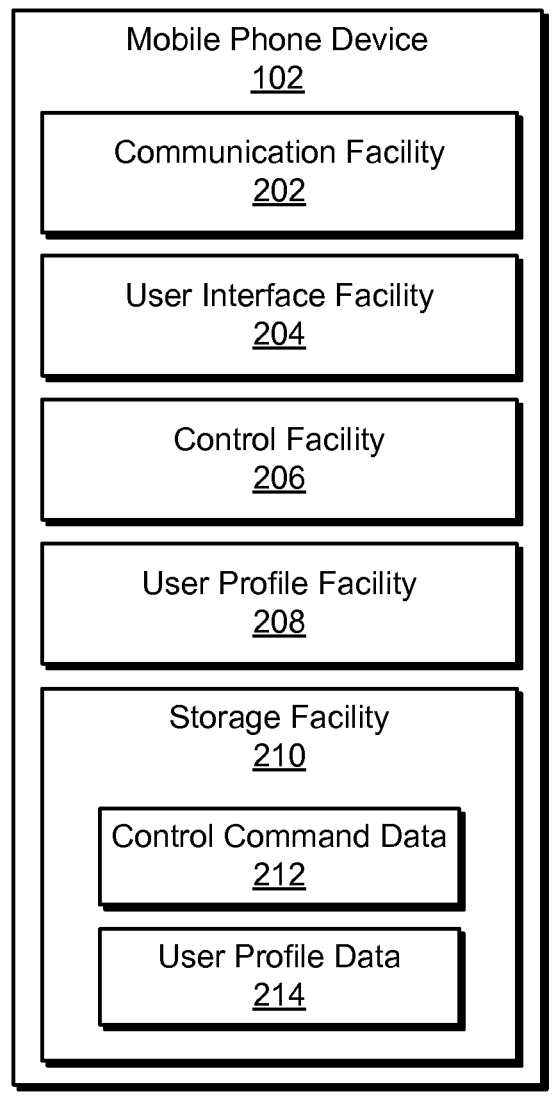
FIG. 2 illustrates exemplary components of a mobile phone device according to principles described herein.

FIG. 2 illustrates exemplary components of mobile phone device 102. As shown in FIG. 2, mobile phone device 102 may include a communication facility 202, a user interface facility 204, a control facility 206, a user profile facility 208, and a storage facility 210, which may be in communication with one another using any suitable communication technologies. It will be recognized that although facilities 202-210 are shown to be separate facilities in FIG. 2, any of those facilities may be combined into a single facility as may serve a particular implementation.

Communication facility 202 may be configured to facilitate selective communication between mobile phone device 102 and one or more of access devices 104. For example, communication facility 202 may be configured to transmit and/or receive communication signals and/or data to/from access device 104 by way of router 108. To this end, as will be described in more detail below, communication facility 202 may establish one or more communication channels between mobile phone device 102 and one or more of access devices 104. Any suitable communication technologies, including any of the communication technologies mentioned herein, may be employed by communication facility 202 to communicate with access devices 104.

User interface facility 204 may be configured to provide one or more user interfaces configured to facilitate user interaction with system 100. For example, user interface facility 204 may provide a user interface through which one or more functions, options, features, and/or tools may be provided to a user and through which user input may be received. In certain embodiments, user interface facility 204 may be configured to provide a graphical user interface ("GUI") for display on a display screen of mobile phone device 102. The graphical user interface may be configured to facilitate inputting of one or more control commands by a user of mobile phone device 102. The one or more control commands may be used by mobile phone device 102 to control at least one operation of one or more access devices 104.

Control facility 206 may be configured to control at least one operation of access devices 104 in accordance with one or more control commands as input by a user of mobile phone device 102. In some examples, control facility 206 may control at least one operation of access devices 104 by directing communication facility 202 to transmit the one or more control commands to one or more of access devices 104 by way of one or more communication channels established by communication facility 202.

User profile facility 208 may be configured to maintain a user profile associated with a user of mobile phone device 102. The user profile may represent one or more personal traits and/or preferences associated with the user, how the user interacts with access devices 104, and/or any other information associated with the user as may serve a particular implementation. User profile facility 208 may facilitate control of access devices 104 in accordance with a user profile associated with a user of mobile phone device 102.

Storage facility 210 may be configured to maintain control command data 212 representative of one or more control commands input by a user of mobile phone device 102 and user profile data 214 representative of a user profile associated with a user of mobile phone device 102. It will be recognized that storage facility 210 may maintain additional or alternative data as may serve a particular implementation.

Figure 3:
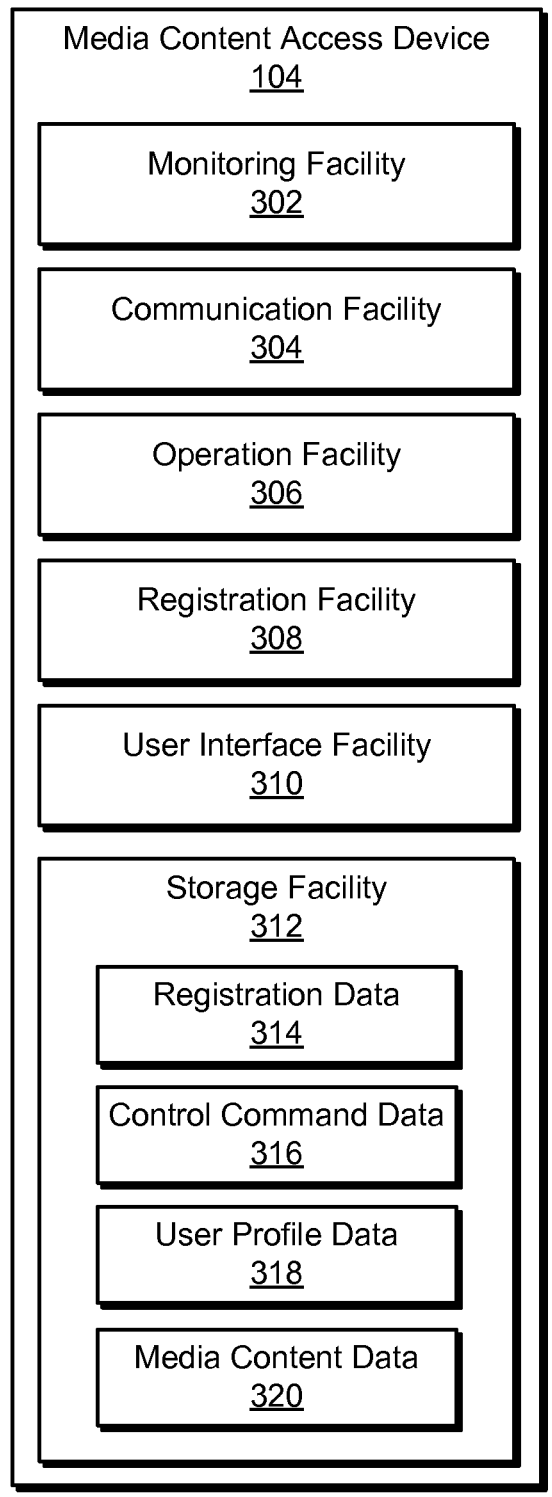
FIG. 3 illustrates exemplary components of an access device according to principles described herein.

FIG. 3 illustrates exemplary components of an access device 104. It will be understood that references to "access device 104" in the description of the components of FIG. 3 refer to any access device (e.g., access device 104-1, 104-2, or 104-3) that may be a part of local area network 106.

As shown in FIG. 3, access device 104 may include a monitoring facility 302, a communication facility 304, an operation facility 306, a registration facility 308, a user interface facility 310, and a storage facility 312, which may be in communication with one another using any suitable communication technologies. It will be recognized that although facilities 302-312 are shown to be separate facilities in FIG. 3, any of those facilities may be combined into a single facility as may serve a particular implementation.

Monitoring facility 302 may be configured to monitor for and detect a request provided by mobile phone device 102 to register mobile phone device 102 with access device 104. The request may be based on user input provided by a user of mobile phone device 102 and may be input by way of a graphical user interface provided for display by access device 104. Exemplary user input will be described in more detail below.

In some examples, monitoring facility 302 may be further configured to monitor for and detect a registration event broadcast or otherwise transmitted by an additional access device across a local area network. The additional access device may be already registered with mobile phone device 102. For example, access device 104-1 may become registered with mobile phone device 102. In response to the registration, access device 104-1 may broadcast a registration event across the local area network. The registration event may include a unique identifier (e.g., a phone number) associated with mobile phone device 102 and/or any other data that may be used to register other access devices (e.g., access devices 104-2 and 104-3) with mobile phone device 102. As will be described in more detail below, if access devices 104-2 and 104-3 are active at the time of the broadcasting of the registration event, they may detect and use the registration event to become registered with mobile phone device 102.

Communication facility 304 may be configured to facilitate communication between access device 104 and mobile phone device 102. For example, communication facility 304 may be configured to transmit and/or receive communication signals and/or data to/from mobile phone device 102 via a wireless network device (e.g., a local wireless network router such as a Wi-Fi enabled router). To this end, communication facility 304 may operate in conjunction with communication facility 202 of mobile phone device 102 to establish a communication channel (e.g., a wireless local area network communication channel) between mobile phone device 102 and access device 104. In some examples, establishment of the communication channel may be initiated upon detection by monitoring facility 302 of a communication signal broadcast by mobile phone device 102. Any suitable communication technologies, including any of the communication technologies mentioned herein, may be employed by communication facility 304 to communicate with mobile phone device 102.

Operation facility 306 may be configured to perform one or more operations associated with access device 104. Exemplary operations that may be performed by operation facility 306 include, but are not limited to, displaying a particular media content instance, changing a media content channel, fast forwarding through media content, rewinding or going back within media content, adjusting (e.g., increasing, decreasing, or muting) a volume level associated with media content, scheduling a recording of media content, purchasing "on-demand" media content, flagging media content as a "favorite" or as something that the user dislikes, rating media content, selecting one or more options available within a program guide or other menu structure, powering access device 104 on or off, and/or any other operation associated with access device 104 as may serve a particular implementation. In some examples, operation facility 306 may perform at least one operation in accordance with one or more control commands input by a user of mobile phone device 102.

Registration facility 308 may be configured to register mobile phone device 102 with access device 104. For example, registration facility 308 may register mobile phone device 102 with access device 104 in response to a request made by a user of mobile phone device 102 and detected by monitoring facility 302. As will be described in more detail below, the registering may be configured to enable selective control of access device 104 by mobile phone device 102 by way of a communication channel included in a local area network (e.g., local area network 106).

Registration facility 308 may be configured to automatically register mobile phone device 102 with one or more additional access devices 104. For example, registration facility 308 may be included in access device 104-1 and may first register mobile phone device 102 with access device 104-1 in response to a request made by a user of mobile phone device 102 and detected by monitoring facility 302. Registration facility 308 may then automatically register access devices 104-2 and 104-3 by broadcasting a registration event across local area network 106.

If access devices 104-2 and 104-3 are active (i.e., powered on, communicatively coupled to local area network 106, and able to detect broadcast registration events) at the time of the broadcasting of the registration event, they may detect the registration event and use the registration event to automatically become registered with mobile phone device 102. Accordingly, a user may use mobile phone device 102 to selectively control any of access devices 104-1 through 104-3 after completing a registration process with only one of the access devices 104.

In some examples, an access device 104 may be inactive (i.e., powered off, unable to communicate by way of local area network 106, and/or otherwise unable to detect broadcast registration events) at the time of the broadcasting of the registration event by registration facility 308. For example, access device 104-2 may be powered off at the time that registration facility 308 included in access device 104-1 broadcasts the registration event. Hence, access device 104-2 cannot register with mobile phone device 102 in response to the broadcasting of the registration event. When access device 104-2 subsequently becomes active (e.g., powered on) after being in an inactive state, access device 104-2 may be configured to automatically broadcast a registration information request command across local area network 106. The registration information request command may be detected by monitoring facility 302 of access device 104-1. In response, access device 104-1 may transmit the registration event to access device 104-2, which may use the registration event to become registered with mobile phone device 102.

User interface facility 310 may be configured to provide one or more user interfaces configured to facilitate user interaction with access device 104. For example, user interface facility 310 may provide a user interface through which one or more functions, options, features, and/or tools may be provided to a user and through which user input may be received. In certain embodiments, user interface facility 310 may be configured to provide a GUI for display on a display screen associated with access device 104. For example, user interface facility 310 may provide for display a GUI configured to facilitate user input of a request to register a mobile phone device with a media content access device.

Storage facility 312 may be configured to maintain registration data 314 used by registration facility 308, control command data 316 representative of one or more control commands transmitted from mobile phone device 102 to access device 104, user profile data 318 representative of one or more user profiles associated with one or more users of access device 104, and media content data 320 representative of media content accessible via access device 104. It will be recognized that storage facility 312 may maintain additional or alternative data as may serve a particular implementation.

Figure 4:
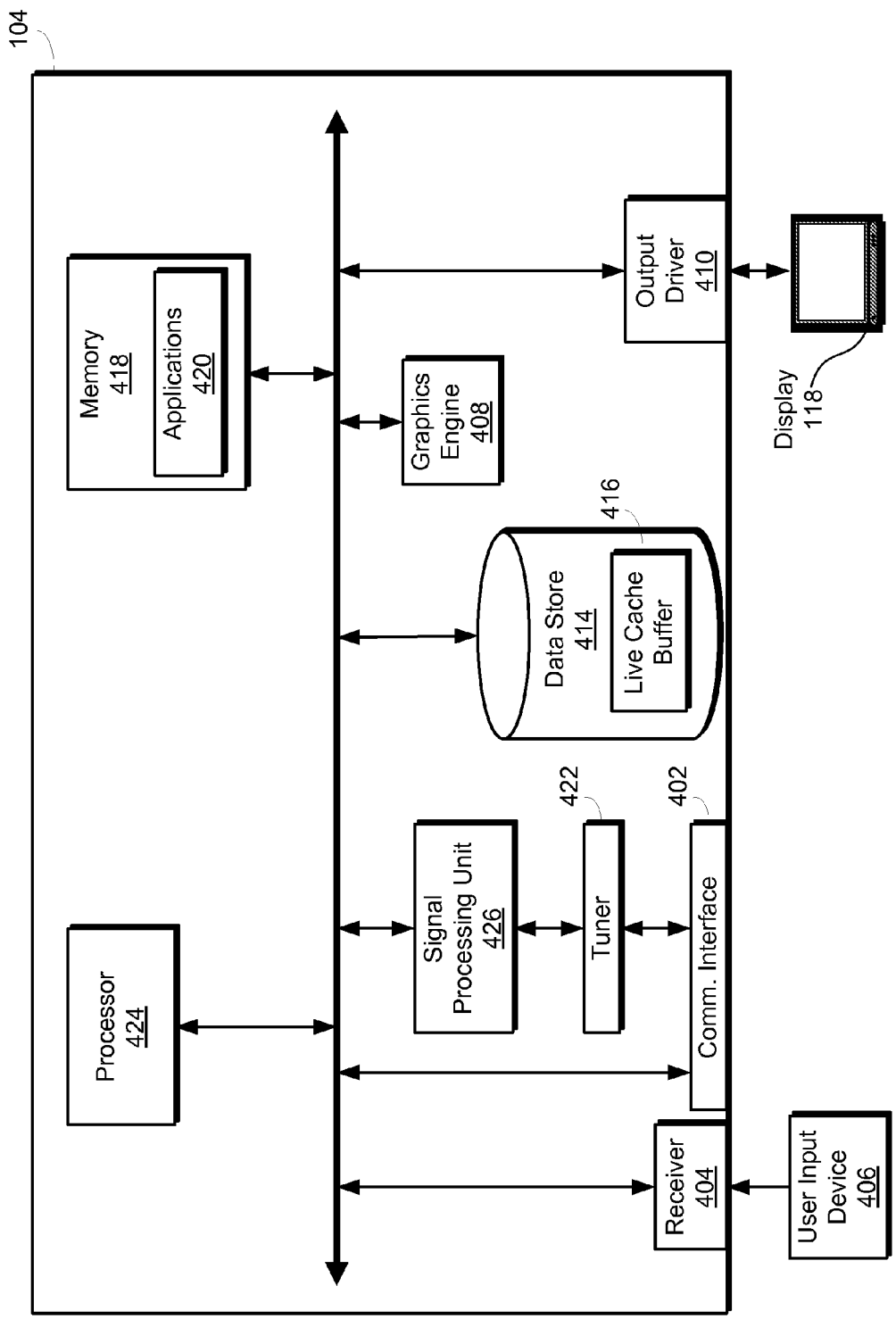
FIG. 4 illustrates an exemplary implementation of an access device according to principles described herein.

FIG. 4 illustrates an exemplary implementation of an access device 104. Various components are shown to be included within access device 104 for illustrative purposes only. It will be recognized that access device 104 may include additional or alternative components as may serve a particular implementation.

As shown in FIG. 4, access device 104 may include a communication interface 402, which may be configured to receive media content and/or other data (e.g., media content metadata, program guide data, display data, etc.) in any acceptable format by way of subscriber television network 112. Communication interface 402 may include any device, logic, and/or other technologies suitable for receiving signals, media content, and/or data. Communication interface 402 may be configured to interface with any suitable communication media, protocols, and formats, including any of those mentioned herein.

Access device 104 may also include a receiver 404 configured to receive user input signals from a user input device 406. User input device 406 may include, for example, a remote control device or any other suitable input device.

Access device 104 may include a graphics engine 408 and an output driver 410. Graphics engine 408 may be configured to generate graphics to be provided to output driver 410, which may be configured to interface with or drive display device 118. Output driver 410 may provide output signals to display 118, the output signals including graphical data (e.g., graphical data representative of media content and/or a graphical user interface) generated by graphics engine 408 and to be presented by display device 118 for experiencing by a user.

Data store 414 may include one or more data storage media, devices, or configurations and may employ any type, form, and combination of storage media. For example, data store 414 may include, but is not limited to, a hard drive, network drive, flash drive, magnetic disc, optical disc, or other non-volatile storage unit. Electronic data, including data disclosed herein, may be temporarily and/or permanently stored in data store 414. Data store 414 is shown to be included within access device 104 in FIG. 4 for illustrative purposes only. It will be understood that data store 414 may additionally or alternatively be located external to access device 104.

Data store 414 may include one or more live cache buffers 416. Live cache buffer 416 may additionally or alternatively reside in memory 418 or in a storage device external to access device 104. In some examples, media content data may be temporarily stored in live cache buffer 416 to facilitate viewing and/or recording of the media content.

Access device 104 may include memory 418. Memory 418 may include, but is not limited to, FLASH memory, random access memory ("RAM"), dynamic RAM ("DRAM"), other suitable computer-readable media, or any combination or sub-combination thereof. In some examples, data representative of one or more applications configured to run on or otherwise be executed by access device 104 may reside in memory 418. For example, data representative of one or more executable applications 420 residing in memory 418 (which may include, but are not limited to, one or more software applications) may be configured to direct processor 424 to perform any of the operations described herein that are associated with access device 104.

Access device 104 may include one or more tuners 422. Tuner 422 may be configured to selectively receive media content carried on a particular media content carrier channel such that the media content may be processed by access device 104. In some examples, media content received by tuner 422 may be temporarily buffered, or stored, in the live cache buffer 416. If there are multiple tuners 422, there may be a live cache buffer 416 corresponding to each of the tuners 422.

While tuner 422 may be used to receive certain media content carrying signals transmitted over subscriber television network 112, access device 104 may be configured to receive other types of media content signals (including media content signals and/or program guide data signals) without using a tuner. For example, digital streams of data packets (e.g., IP-based data packets) may be received without using a tuner. For such types of media content signals, communication interface 402 may receive and forward the signals directly to other components of access device 104 (e.g., processor 424 or signal processing unit 426, described in more detail below) without the signals going through tuner 422. For an IP-based signal, for example, signal processing unit 426 may function as an IP receiver.

In certain embodiments, other data may be received by communication interface 402 and forwarded to one or more components of access device 104 without going through tuner 422. For example, communication interface 402 may be configured to send and receive data (e.g., display data such as image data representative of a graphical user interface display) by way of an IP backchannel of subscriber television network 112.

Access device 104 may include at least one processor, such as processor 424, configured to control and/or perform one or more operations of access device 104. Access device 104 may also include a signal processing unit 426 configured to process incoming media content. Signal processing unit 426 may be configured, for example, to demodulate and parse encoded digital media content. In some examples, access device 104 may include one or more signal processing units 426 corresponding to each of the tuners 422.

Figure 5:
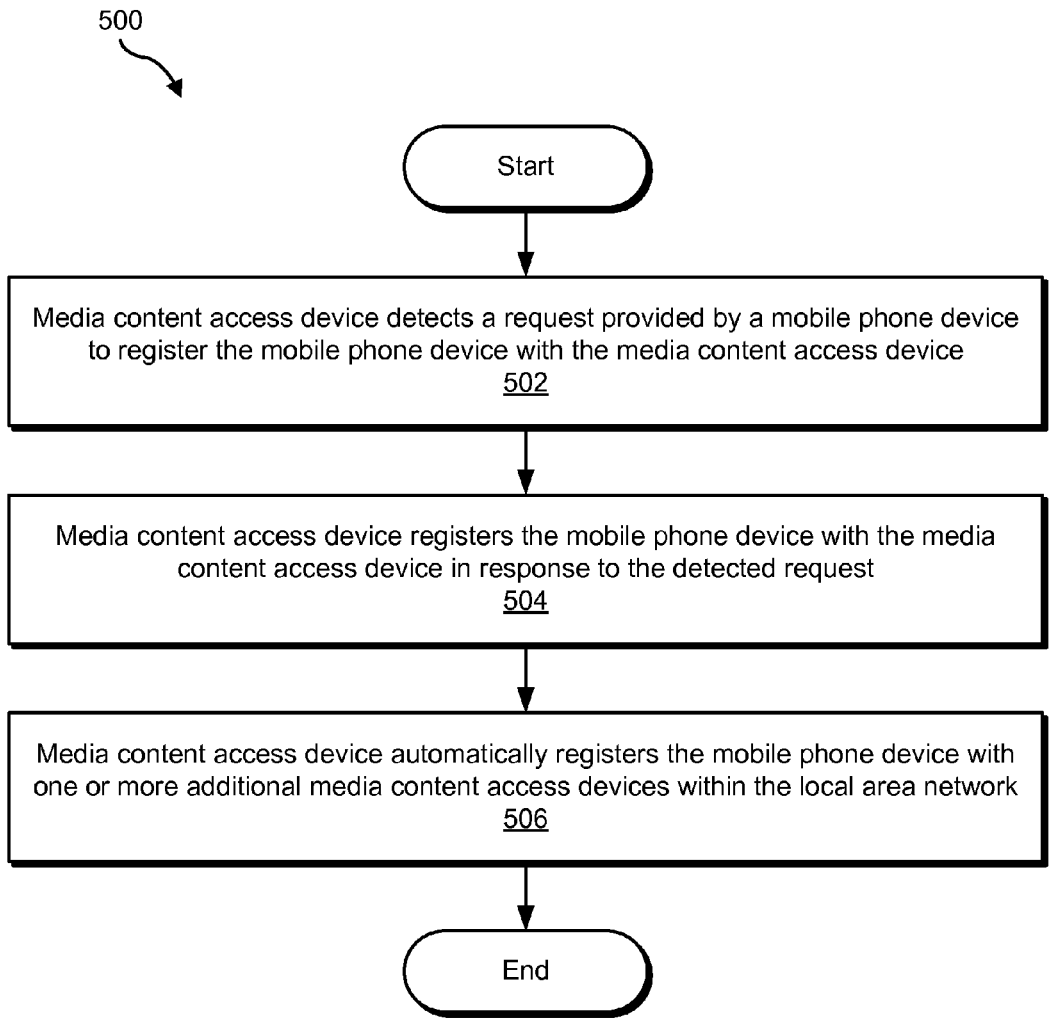
FIG. 5 illustrates an exemplary method of automatically registering a mobile phone device with one or more media content access devices according to principles described herein.

FIG. 5 illustrates an exemplary method 500 of automatically registering a mobile phone device with one or more media content access devices. While FIG. 5 illustrates exemplary steps according to one embodiment, other embodiments may omit, add to, reorder, and/or modify any of the steps shown in FIG. 5. The steps shown in FIG. 5 may be performed by an access device 104 (e.g., access device 104-1).

In step 502, a media content access device detects a request provided by a mobile phone device to register the mobile phone device with the media content access device. The request may be detected in any suitable manner as may serve a particular implementation. For example, the request may be based on user input provided by a user of the mobile phone device and may be input by the user by way of a GUI provided for display by the media content access device.

Figure 6:
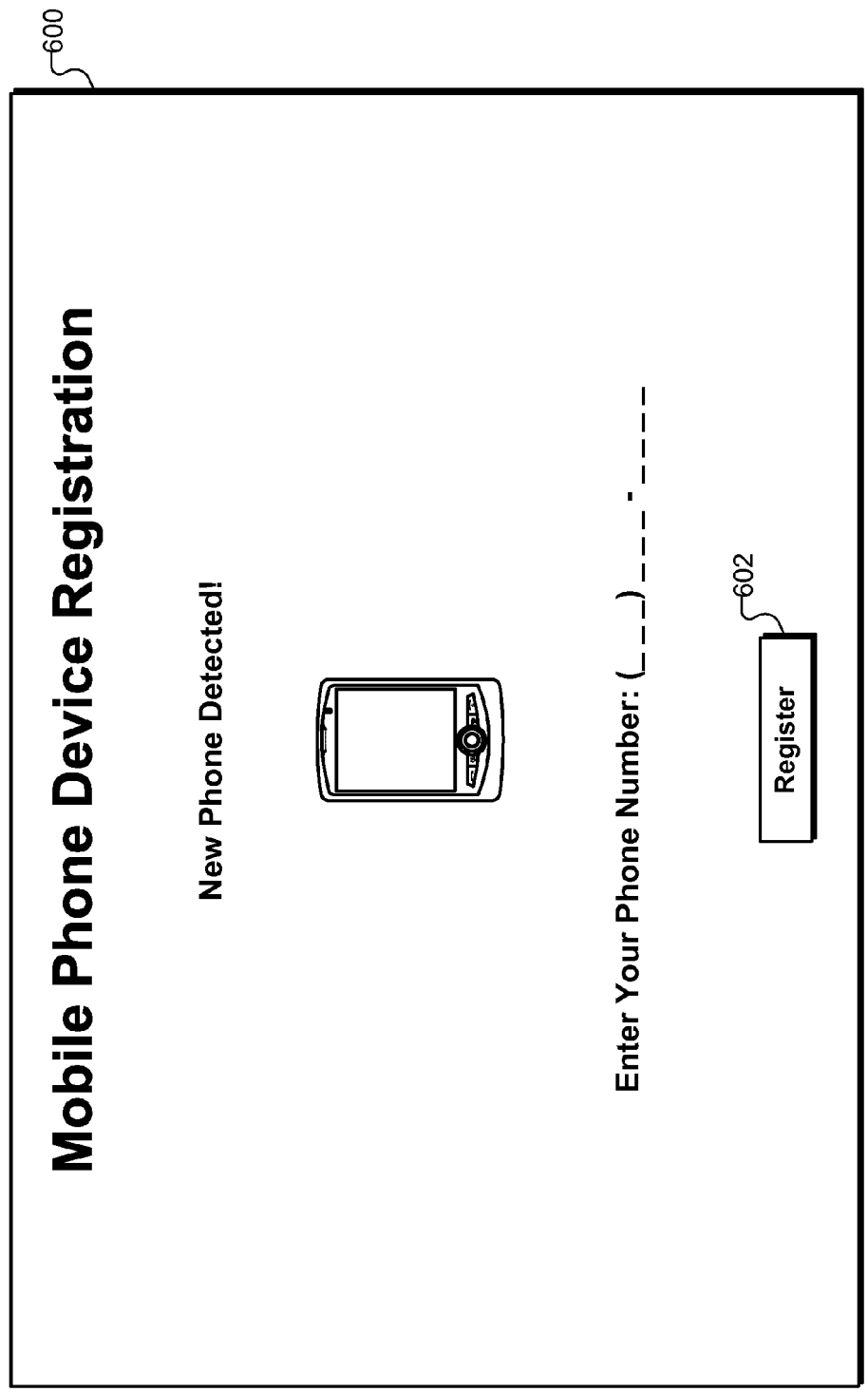
FIG. 6 shows an exemplary graphical user interface ("GUI") that may be used to register a mobile phone device with an access device according to principles described herein.

To illustrate, FIG. 6 shows an exemplary GUI 600 that may be provided for display by access device 104-1 and that may be used by a user of mobile phone device 102 to register mobile phone device 102 with access device 104-1. As shown in FIG. 6, GUI 600 may indicate that access device 104-1 has detected a presence of mobile phone device 102 within local area network 106. Access device 104-1 may detect the presence of mobile phone device 102 within local area network 106 in any suitable manner as may serve a particular implementation. For example, access device 104-1 may detect that mobile phone device 102 has established a connection with router 108.

As shown, GUI 600 may facilitate input by a user of information that may be used by access device 104-1 to register mobile phone device 102 with access device 104-1. For example, the user may input a phone number associated with mobile phone device 102 and/or any other unique identifier associated with mobile phone device 102 and select a "register" option 602 in order to direct access device 104-1 to register mobile phone device 102 with access device 104-1.

Returning to FIG. 5, in step 504, the media content access device registers the mobile phone device with the media content access device in response to the request detected in step 502. The registration may be performed by the media content access device in any suitable manner as may serve a particular implementation. For example, the registration may include the media content access device storing the phone number associated with the mobile phone device that is entered by the user by way of GUI 600 and/or by performing one or more operations configured to enable selective control of the media content access device by the mobile phone device by way of a communication channel included in a local area network (e.g., local area network 106). Exemplary manners in which a mobile phone device may control a media content access device will be described in more detail below.

In step 506, the media content access device automatically registers the mobile phone device with one or more additional media content access devices within the local area network. The automatic registering is configured to enable selective control of the one or more additional media content access devices by the mobile phone device by way of one or more communication channels included in the local area network.

The automatic registering described in step 506 may be performed in any suitable manner as may serve a particular implementation. For example, the media content access device may broadcast a registration event comprising a unique identifier (e.g., a phone number) associated with the mobile phone device across the local area network. Another media content access device that is a part of the local area network and active at the time of the broadcasting of the registration event may detect the registration event, validate the unique identifier included in the registration event, and store the unique identifier for subsequent access. In this manner, the active media content access device may be automatically registered with the mobile phone device. Once registered, the active media content access device may transmit data representative of an acknowledgement of the registration to the media content access device that broadcasted the registration event.

The active media content access device may validate the unique identifier included in the registration event in any suitable manner as may serve a particular implementation. To illustrate, a user of mobile phone device 102 shown in FIG. 1 may manually request registration of mobile phone device 102 with access device 104-1 by entering a phone number associated with mobile phone device 102 into a registration GUI provided for display by access device 104-1. Access device 104-1 may respond by registering mobile phone device 102 with access device 104-1. In response to the registration, access device 104-1 may generate a key based on a nonce value, which may include a timestamp and/or any other sequence of characters. Access device 104-1 may then broadcast the phone number, key, and nonce value as part of the registration event across local area network 106. Access device 104-2 may be active at the time of the broadcast and therefore detect the registration event. To validate the phone number, access device 104-2 may generate a second key based on the nonce value included in the registration event and compare the second key to the key included in the registration event. If the keys match, the phone number may be deemed valid and access device 104-2 may use the phone number to automatically register mobile phone device 102 with access device 104-2. Alternatively, if the keys do not match, access device 104-2 may determine that something is wrong with the broadcast registration event and request that the registration event be rebroadcast, ignore the registration event, and/or take any other suitable action.

In some examples, the registration event broadcast by the media content access device may be encrypted. The registration event may be encrypted in any suitable manner as may serve a particular implementation. A media content access device that detects the registration event may be configured to decrypt the registration event in any suitable manner as may serve a particular implementation.

The automatic registering described in step 506 may additionally or alternatively include the media content access device automatically registering one or more media content access devices that are inactive at the time of the broadcasting of the registration event. For example, the automatic registering may include access device 104-1 detecting a registration information request command transmitted by access device 104-3 after access device 104-3 becomes active after being in an inactive state. The registration information request command may include data representative of a request for other access devices 104 within local area network 106 to transmit to access device 104-3 any previously broadcast registration events that have not previously been detected by access device 104-3. Upon detecting the registration information request command, access device 104-1 may retransmit the registration event associated with mobile phone device 102 to access device 104-3, which may use the registration event to become registered with mobile phone device 102.

Hence, method 500 of FIG. 5 may allow a mobile phone device to automatically become registered with various media content access devices included within a local area network after being manually registered with just one of the media content access devices. Accordingly, a user may selectively use the mobile phone device to control one or more operations of any of the media content access devices included within the local area network.

Figure 7:
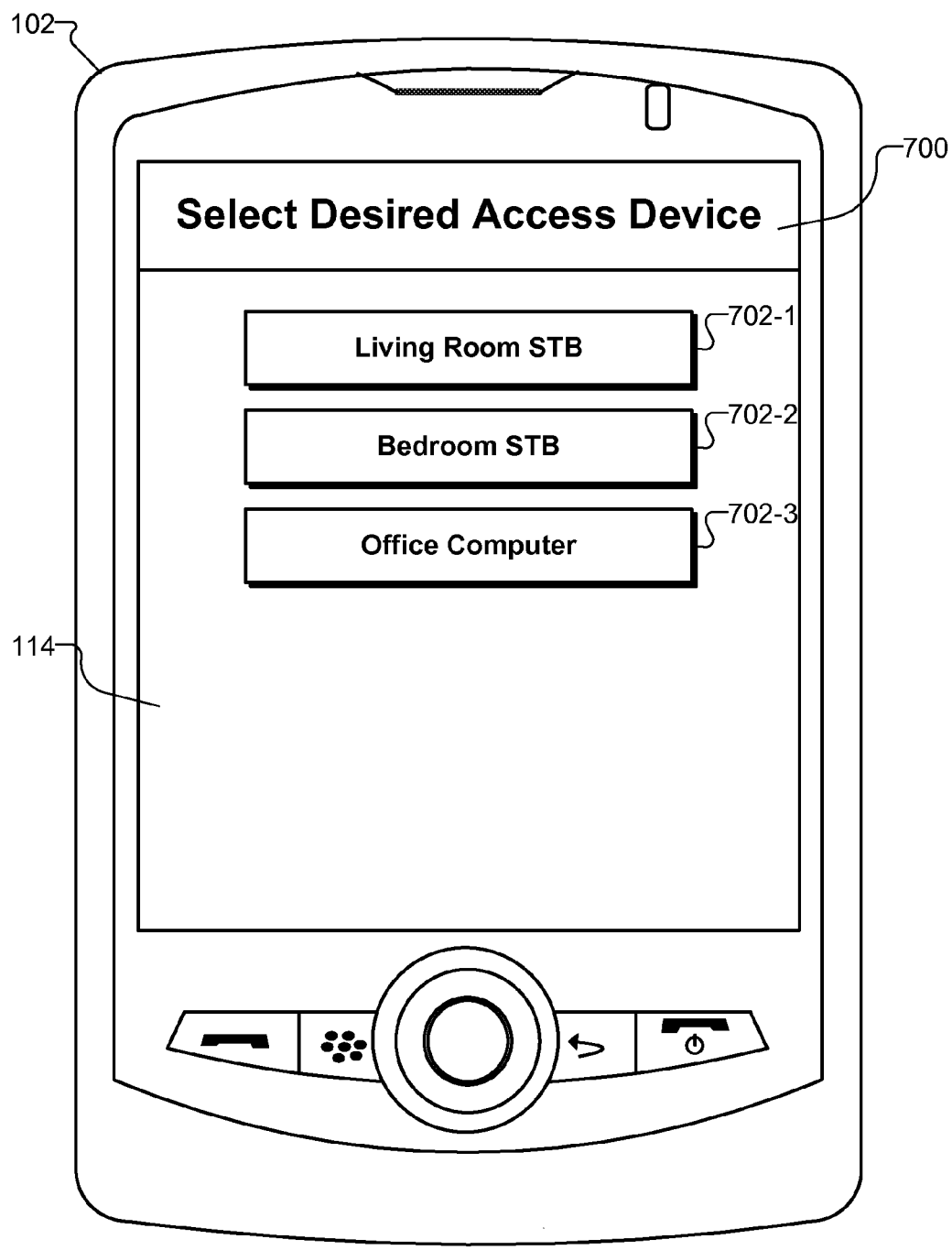
FIG. 7 illustrates an exemplary GUI that may be displayed by a mobile phone device and that may be used to select a registered media content access device for control by the mobile phone device according to principles described herein.

FIG. 7 illustrates an exemplary GUI 700 that may be displayed by mobile phone device 102 and that may be used to select a registered media content access device for control by mobile phone device 102. As shown in FIG. 7, GUI 700 may be displayed on display screen 114 of mobile phone device 102 and may list various access devices (e.g., a living room set-top box device 702-1, a bedroom set-top box device 702-2, and an office computer 702-3) that have been registered with mobile phone device 102. A user may select one of the access devices in order to control that access device with mobile phone device 102.

In some examples, a communication channel may be established between mobile phone device 102 and an access device selected from within GUI 700. Mobile phone device 102 may then use the communication channel to control the selected access device. The communication channel may be established according to any suitable transmission protocol and in any manner as may serve a particular implementation.

Figure 8:
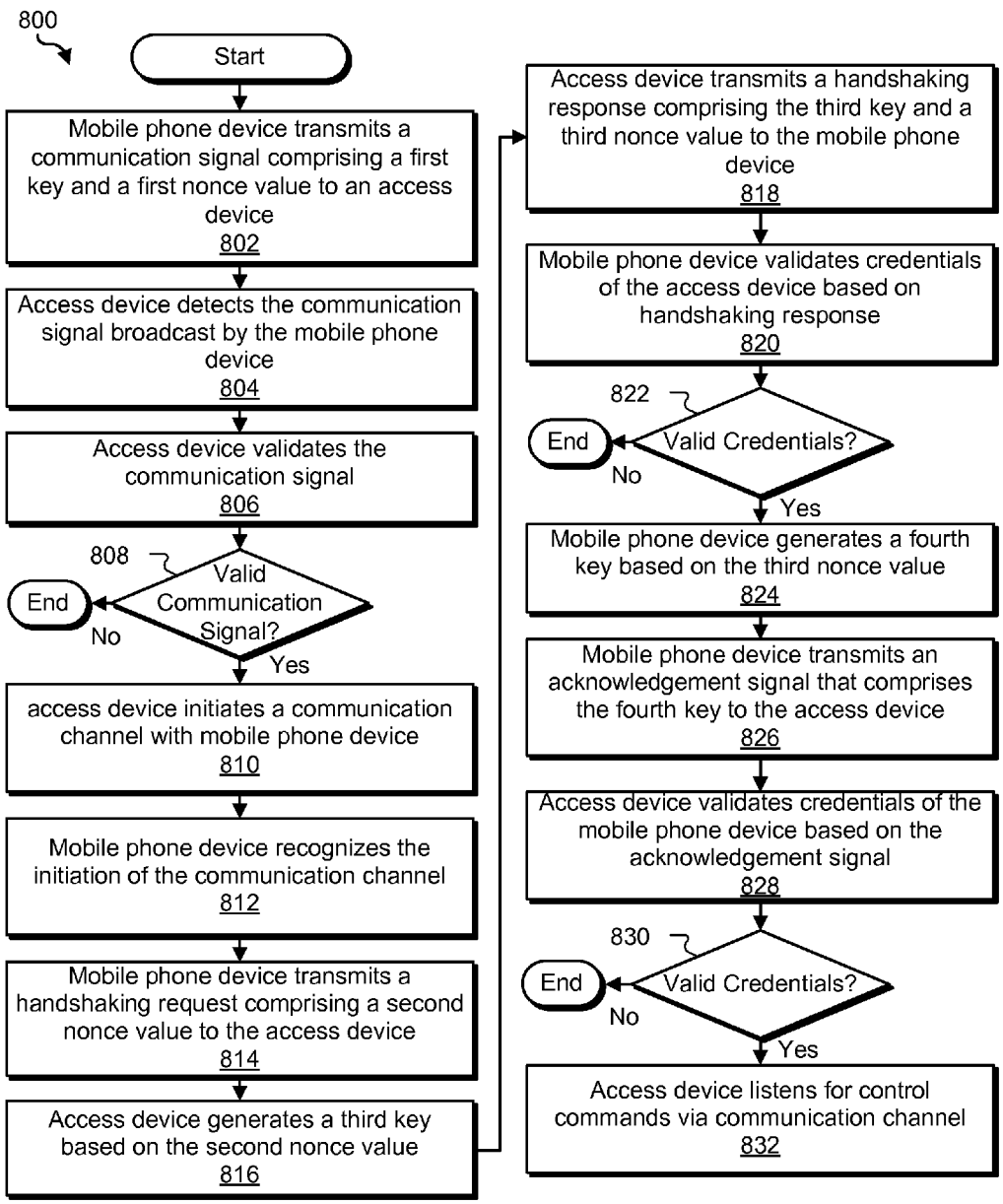
FIG. 8 illustrates an exemplary method of establishing a local area network communication channel between a mobile phone device and an access device according to principles described herein.

FIG. 8 illustrates an exemplary method of establishing a local area network communication channel between mobile phone device 102 and an access device 104 (e.g., access device 104-1). The method illustrated in connection with FIG. 8 may be used to ensure session and data security during transmission of data between mobile phone device 102 and access device 104-1. While FIG. 8 illustrates exemplary steps according to one embodiment, other embodiments may omit, add to, reorder, and/or modify any of the steps shown in FIG. 8. Various steps illustrated in FIG. 8 may be performed by mobile phone device 102 (or by facilities thereof) while other steps illustrated in FIG. 8 may be performed by access device 104-1 (or by facilities thereof).

In step 802, mobile phone device 102 transmits a communication signal to access device 104-1. The communication signal may be transmitted by mobile phone device 102 in response to a user selection of access device 104-1 in any suitable manner (e.g., in the form of one or more wirelessly transmitted packets) and may include data representative of a key (referred to herein as a "first key") and a nonce value (referred to herein as a "first nonce value"). The nonce value may include any sequence of characters as may serve a particular implementation. For example, the nonce value may include a random or pseudo-random number, a timestamp generated during the broadcast of the communication signal, and/or any other sequence of characters as may serve a particular implementation.

The key included within the communication signal may be generated by mobile phone device 102 using a combination of the nonce value and the unique identifier (e.g., a phone number) associated with mobile phone device 102. For example, if the unique identifier is "5123456789" and the nonce value is "987654321", the combined string "5123456789987654321" may be formed and used as an input to generate the key. In some alternative examples, the key is further based on a password and/or on any other sequence of characters.

In step 804, access device 104-1 detects the communication signal transmitted by mobile phone device 102. Access device 104-1 may be configured to monitor for and detect the communication signal in any suitable manner.

In step 806, access device 104-1 validates the communication signal. For example, access device 104-1 may be configured to generate a key (referred to herein as a "second key") based on the nonce value included within the broadcast communication signal. The generation of the second key is further based on the unique identifier of mobile phone device 102 that is stored within access device 104-1. After access device 104-1 generates the second key, access device 104-1 may compare the first and second keys to determine whether they match one another. Matching keys indicate that the communication signal is valid. In other words, if the first and second keys match, mobile phone device 102 may be registered and authorized to communicate with access device 104-1. Conversely, if the first and second keys do not match (i.e., they are different one from another), mobile phone device 102 is not authorized to communicate with access device 104-1 and further communication between mobile phone device 102 and access device 104-1 may be prevented.

If it is determined that the communication signal is not valid (No; step 808), the remaining steps of establishing a local area network communication channel shown in FIG. 8 are not performed. If it is determined that the communication signal is valid (Yes; step 808), access device 104-1 initiates a communication channel with mobile phone device 102, as shown in step 810. The channel may include a transmission control protocol ("TCP") communication channel or any other suitable communication channel established by way of local area network 106 as may serve a particular implementation.

In step 812, mobile phone device 102 recognizes the initiation of the communication channel performed in step 810. However, before mobile phone device 102 may control access device 104-1 via the communication channel, the communication channel is authenticated using the remaining steps illustrated in FIG. 8.

In step 814, mobile phone device 102 transmits a handshaking request to access device 104-1. The handshaking request is configured to authenticate the communication channel initiated in step 810 and may include a nonce value (referred to herein as a "second nonce value"). As will be described in more detail below, the second nonce value may be used by access device 104-1 to generate a response to the handshaking request.

In step 816, access device 104-1 generates a key (referred to herein as a "third key") based on the second nonce value. The generation of the third key is further based on the unique identifier associated with access device 104-1. The third key may be generated by access device 104-1 in any suitable manner as may serve a particular implementation.

In step 818, access device 104-1 transmits a handshaking response to mobile phone device 102. The handshaking response includes the third key that was generated by access device 104-1 and a newly generated nonce value (referred to herein as a "third nonce value").

In step 820, mobile phone device 102 uses the handshaking response to validate credentials of access device 104-1. For example, mobile phone device 102 may extract the third key from the handshaking response and analyze the key to determine whether it was generated using a valid unique identifier (i.e., a unique identifier that matches the unique identifier associated with mobile phone device 104-1). If the handshaking response indicates that access device 104-1 does not have valid credentials (No; step 822), the communication channel is closed. If the handshaking response indicates that access device 104-1 includes valid credentials (Yes; step 822), mobile phone device 102 generates a key (referred to herein as a "fourth key") based on the third nonce value that was included in the handshaking response, as shown in step 824. The generation of the fourth key is further based on the unique identifier associated with mobile phone device 102.

In step 826, mobile phone device 102 transmits an acknowledgment signal to access device 104-1. The acknowledgment signal is configured to acknowledge that mobile phone device 102 has validated the credentials of access device 104-1. The acknowledgment signal is further configured to include the fourth key generated by mobile phone device 102. In this manner, access device 104-1 may also validate the credentials of mobile phone device 102.

In step 828, access device 104-1 validates the credentials of mobile phone device 102 based on the acknowledgment signal. For example, access device 104-1 may extract the fourth key from the acknowledgment signal and analyze the fourth key to determine whether the fourth key was generated by mobile phone device 102 using a valid unique identifier that matches the unique identifier stored by access device 104-1.

If it is determined that mobile phone device 102 does not have valid credentials (No; step 830), the communication channel is closed. However, if it is determined that mobile phone device 102 has valid credentials (Yes; step 830), a communication channel has successfully been established between mobile phone device 102 and access device 104-1. In step 832, access device 104-1 listens for control commands sent by mobile phone device 102 via the communication channel. In some examples, to ensure that the communication channel remains secure, access device 104-1 may periodically challenge mobile phone device 102 using a handshaking request similar to that described above. If, at any point within the communication session, either access device 104-1 or mobile phone device 102 fails to respond to a handshaking request successfully, the communication channel may be closed.

The communication protocol described in connection with FIG. 8 that is used to establish a communication channel may vary as may serve a particular implementation. For example, access device 104-1 may be configured to transmit the initial handshaking request instead of the mobile phone device 102.

Figure 9:
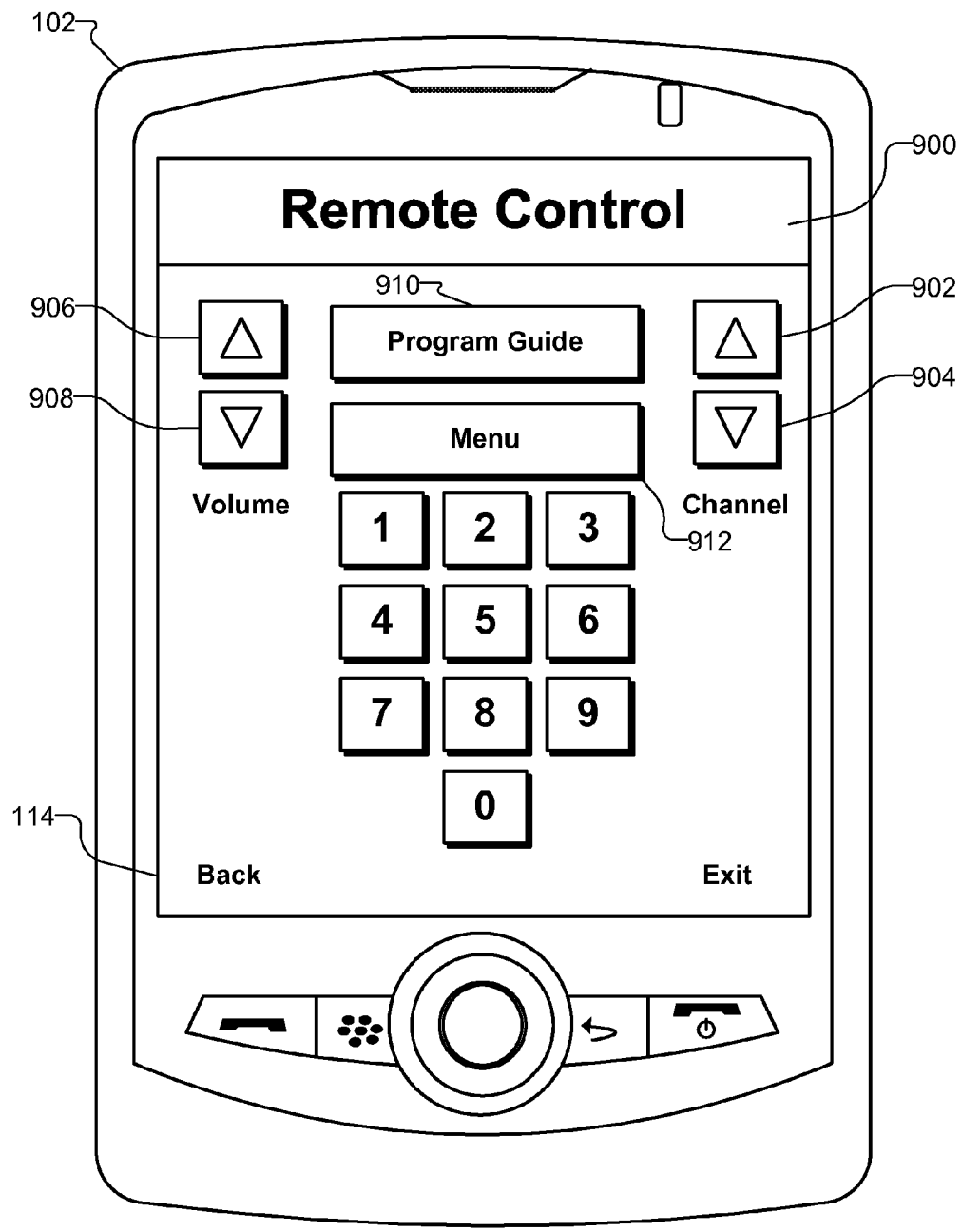
FIG. 9 illustrates an exemplary remote control emulation GUI according to principles described herein.

FIG. 9 illustrates an exemplary remote control emulation GUI 900 that may be displayed on display screen 114 of mobile phone device 102 and configured to facilitate inputting of one or more control commands by a user. As shown in FIG. 9, remote control emulation GUI 900 may be configured to emulate a remote control device associated with an access device 104. To this end, remote control emulation GUI 900 may include a plurality of graphical objects representative of buttons that may be located on a remote control device. For example, graphical objects 902 and/or 904 may be selected by a user to direct access device 104 to switch from one channel to another. Additionally or alternatively, graphical objects 906 and/or 908 may be selected by a user to adjust a volume level of a media content instance being presented by access device 104. Graphical object 910 may be selected by a user to access a program guide associated with media content available by way of access device 104. Graphical object 912 may be selected by a user to access a menu of options associated with access device 104. It will be recognized that additional or alternative graphical objects representative of other buttons located on a remote control device associated with access device 104 may be displayed within remote control emulation GUI 900 as may serve a particular implementation.

Selection of any of the graphical objects included within remote control emulation GUI 900 and in the other GUIs described herein may cause mobile phone device 102 to control a corresponding operation of access device 104. For example, selection of graphical object 902 causes mobile phone device 102 to direct access device 104 to switch to a sequentially higher channel.

Figure 10:
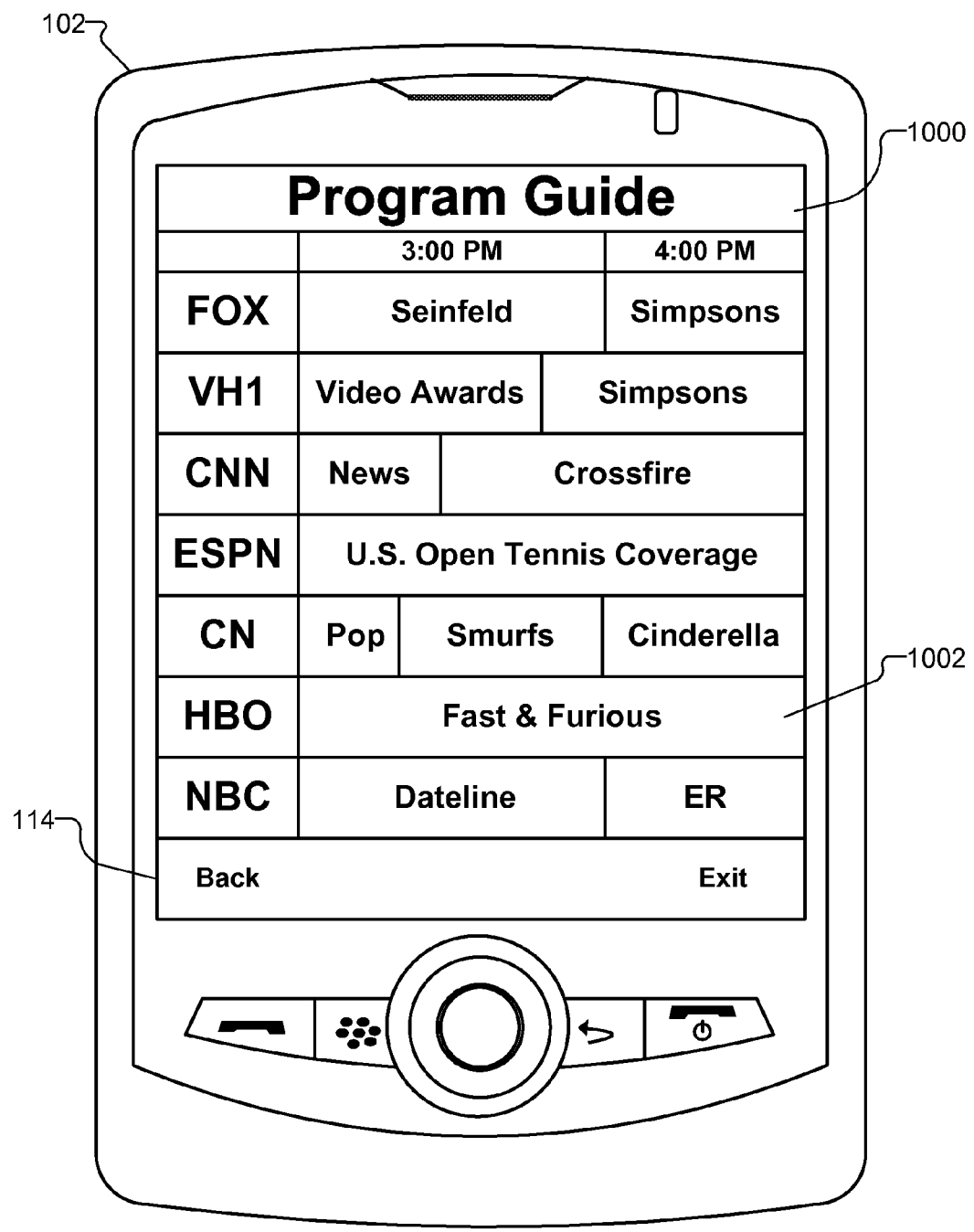
FIG. 10 illustrates an exemplary program guide GUI according to principles described herein.

FIG. 10 illustrates an exemplary program guide GUI 1000 that may be displayed on display screen 114 of mobile phone device 102. In some examples, program guide GUI 1000 is displayed in response to a user selection of program guide graphical object 910 shown in FIG. 9. As shown in FIG. 10, program guide GUI 1000 may display a listing of media content instances available via the access device 104 during one or more time blocks.

A benefit of displaying program guide GUI 1000 on display screen 114 of mobile phone device 102 is that the user may search through various media content listings within the program guide GUI 1000 without having to display the program guide on a display device 118 (e.g., a television) associated with access device 104. In this manner, a user may view a full screen rendition of a particular media content instance on display device 118 and at the same time use program guide GUI 1000 displayed on display screen 114 of mobile phone device 102 to browse through a listing of various other media content instances available via access device 104.

Figure 11:
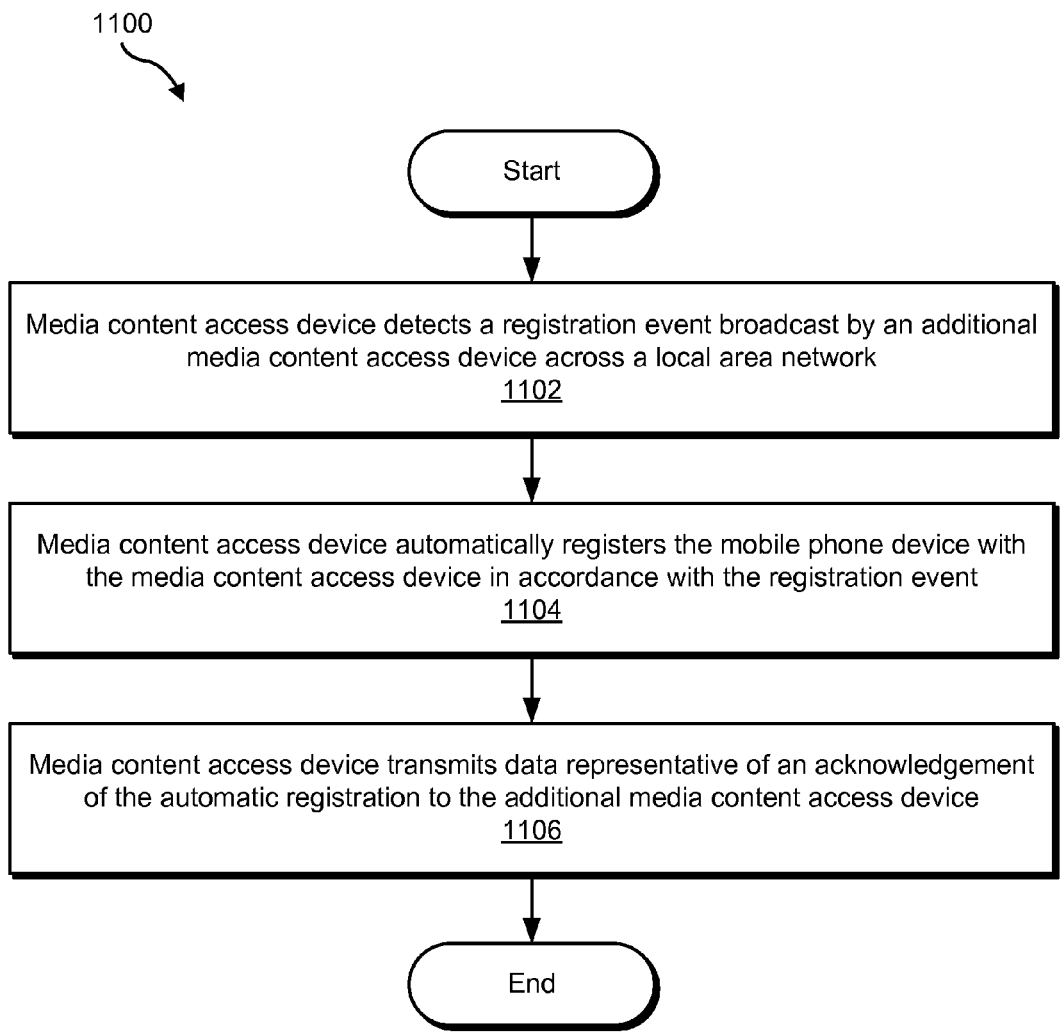
FIG. 11 illustrates another exemplary method of automatically registering a mobile phone device with a media content access device according to principles described herein.

FIG. 11 illustrates another exemplary method 1100 of automatically registering a mobile phone device with a media content access device. While FIG. 11 illustrates exemplary steps according to one embodiment, other embodiments may omit, add to, reorder, and/or modify any of the steps shown in FIG. 11. The steps shown in FIG. 11 may be performed by any one of access devices 104.

In step 1102, a media content access device detects a registration event broadcast by an additional media content access device across a local area network. The registration event may include a unique identifier (e.g., a phone number) associated with a mobile phone device already registered with the additional media content access device. Step 1102 may be performed in any of the ways described herein.

In step 1104, the media content access device automatically registers the mobile phone device with the media content access device in accordance with the registration event. The automatic registering is configured to enable selective control of the media content access device by the mobile phone device by way of a communication channel included in the local area network. Step 1104 may be performed in any of the ways described herein.

In step 1106, the media content access device transmits data representative of an acknowledgement of the automatic registration to the additional media content access device. Step 1106 may be performed in any of the ways described herein.

Figure 12:
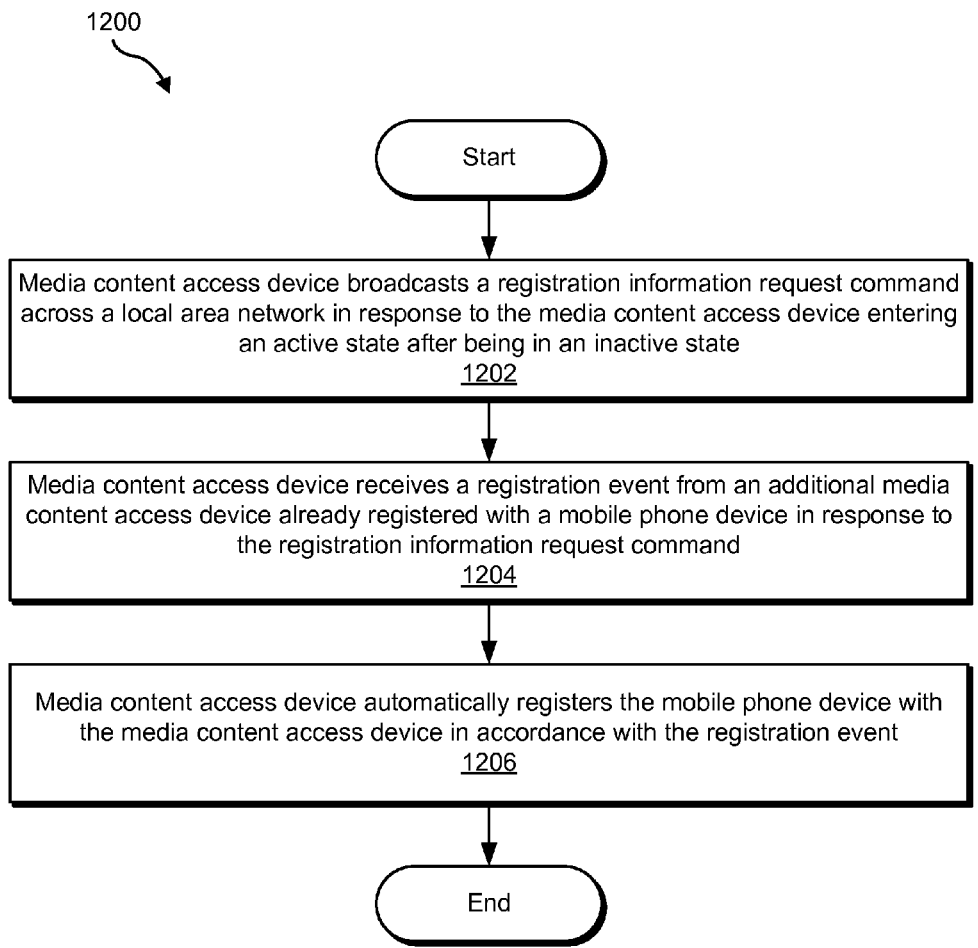
FIG. 12 illustrates another exemplary method of automatically registering a mobile phone device with a media content access device according to principles described herein.

FIG. 12 illustrates another exemplary method 1200 of automatically registering a mobile phone device with a media content access device. While FIG. 12 illustrates exemplary steps according to one embodiment, other embodiments may omit, add to, reorder, and/or modify any of the steps shown in FIG. 12. The steps shown in FIG. 12 may be performed by any one of access devices 104.

In step 1202, a media content access device broadcasts a registration information request command across a local area network in response to the media content access device entering an active state after being in an inactive state. Step 1202 may be performed in any of the ways described herein.

In step 1204, the media content access device receives a registration event from an additional media content access device already registered with a mobile phone device in response to the registration information request command. Step 1204 may be performed in any of the ways described herein.

In step 1206, the media content access device automatically registers the mobile phone device with the media content access device in accordance with the registration event. The automatic registering is configured to enable selective control of the media content access device by the mobile phone device by way of a communication channel included in the local area network. Step 1206 may be performed in any of the ways described herein.

Figure 13:
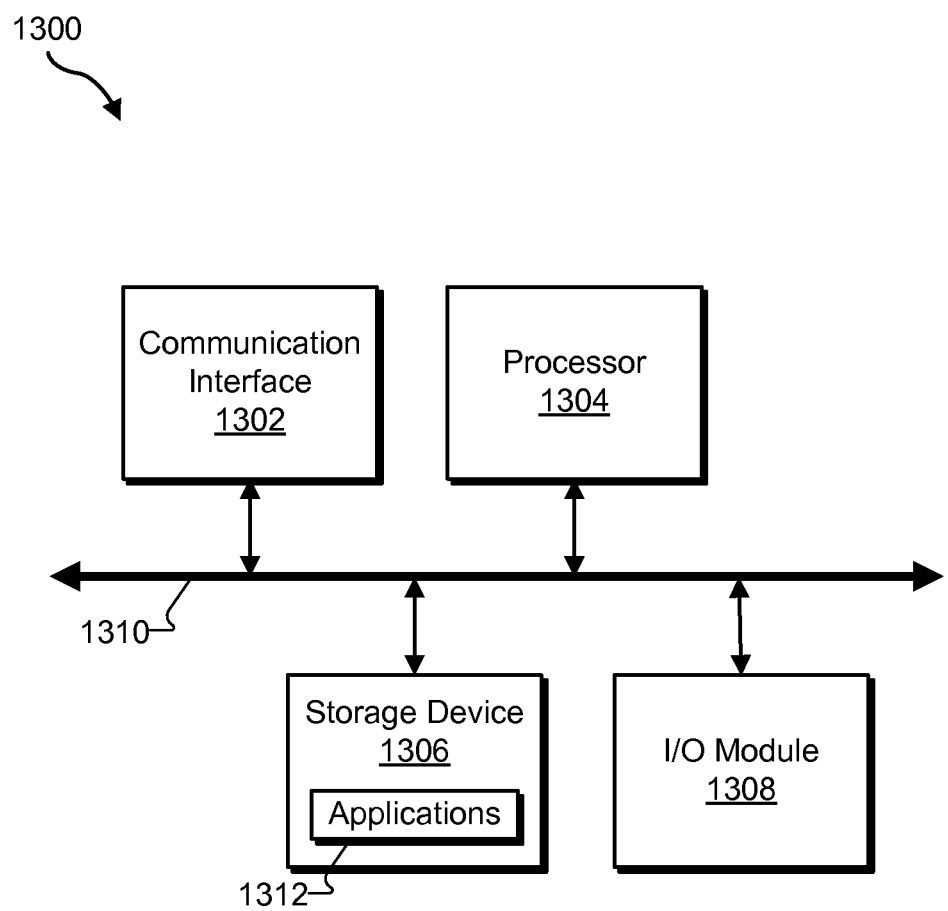
FIG. 13 illustrates an exemplary computing device according to principles described herein.

FIG. 13 illustrates an exemplary computing device 1300 that may be configured to perform one or more of the processes described herein. As shown in FIG. 13, computing device 1300 may include a communication interface 1302, a processor 1304, a storage device 1306, and an input/output ("I/O") module 1308 communicatively connected via a communication infrastructure 1310. While an exemplary computing device 1300 is shown in FIG. 13, the components illustrated in FIG. 13 are not intended to be limiting. Additional or alternative components may be used in other embodiments.

Components of computing device 1300 shown in FIG. 13 will now be described in additional detail.

Communication interface 1302 may be configured to communicate with one or more computing devices. Examples of communication interface 1302 include, without limitation, a wired network interface (such as a network interface card), a wireless network interface (such as a wireless network interface card), a modem, and any other suitable interface. Communication interface 1302 may additionally or alternatively provide such a connection through, for example, a local area network (such as an Ethernet network), a personal area network, a telephone or cable network, a satellite data connection, a dedicated URL, or any other suitable connection. Communication interface 1302 may be configured to interface with any suitable communication media, protocols, and formats, including any of those mentioned above.

Processor 1304 generally represents any type or form of processing unit capable of processing data or interpreting, executing, and/or directing execution of one or more of the instructions, processes, and/or operations described herein. Processor 1304 may direct execution of operations in accordance with one or more applications 1312 or other computer-executable instructions such as may be stored in storage device 1306 or another non-transitory computer-readable medium.

Storage device 1306 may include one or more data storage media, devices, or configurations and may employ any type, form, and combination of data storage media and/or device. For example, storage device 1306 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1306. For example, data representative of one or more executable applications 1312 (which may include, but are not limited to, one or more of the software applications described herein) configured to direct processor 1304 to perform any of the operations described herein may be stored within storage device 1306. In some examples, data may be arranged in one or more databases residing within storage device 1306.

I/O module 1308 may be configured to receive user input and provide user output and may include any hardware, firmware, software, or combination thereof supportive of input and output capabilities. For example, I/O module 1308 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1308 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1308 is configured to provide graphical data to a display for presentation to a user. The graphical data may be representative of one or more graphical user interfaces and/or any other graphical content as may serve a particular implementation.

In some examples, any of the devices and/or facilities described herein may be implemented by or within one or more components of computing device 1300. For example, one or more applications 1312 residing within storage device 1306 may be configured to direct processor 1304 to perform one or more processes or functions associated with communication facility 202, user interface facility 204, control facility 206, user profile facility 208, monitoring facility 302, communication facility 304, operation facility 306, registration facility 308, and/or user interface facility 310. Likewise, storage facility 210 and/or storage facility 312 may be implemented by or within storage device 1306.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   detecting, by a media content access device, a request provided by a mobile phone device to register the mobile phone device with the media content access device;
   registering, by the media content access device, the mobile phone device with the media content access device in response to the detected request, the registering configured to enable selective control of the media content access device by the mobile phone device by way of a communication channel included in a local area network; and
   automatically registering, by the media content access device, the mobile phone device with one or more additional media content access devices within the local area network, the automatic registering configured to enable selective control of the one or more additional media content access devices by the mobile phone device by way of one or more additional communication channels included in the local area network.

2. The method of claim 1, further comprising:
   performing, by the media content access device, at least one operation in accordance with one or more control commands transmitted by the mobile phone device by way of the communication channel.

3. The method of claim 1, further comprising:
   performing, by a media content access device included in the one or more additional media content access devices, at least one operation in accordance with one or more control commands transmitted by the mobile phone device by way of a communication channel included in the one or more additional communication channels.

4. The method of claim 1, wherein the automatically registering comprises:
   broadcasting a registration event across the local area network, the registration event comprising a unique identifier associated with the mobile phone device; and
   receiving an acknowledgement from a particular media content access device included in the one or more additional media content access devices and that is active at a time of the broadcasting of the registration event, the acknowledgement comprising an acknowledgement of a registration of the mobile phone device with the particular media content access device based on the registration event.

5. The method of claim 4, wherein the registration event is encrypted.

6. The method of claim 1, wherein the automatically registering comprises:

broadcasting a registration event across the local area network, the registration event comprising a unique identifier associated with the mobile phone device; and detecting a registration information request command transmitted by a particular media content access device included in the one or more additional media content access devices and that is inactive at a time of the broadcasting of the registration event, the registration information request command being transmitted by the particular media content access device in response to the particular media content access device becoming active; and transmitting the registration event to the particular media content access device in response to the detecting of the registration information request command.

7. The method of claim 6, wherein the automatically registering further comprises receiving an acknowledgement from the particular media content access device, the acknowledgement comprising an acknowledgement of a registration of the mobile phone device with the particular media content access device based on the registration event.

8. The method of claim 1, further comprising providing for display, by the media content access device, a graphical user interface configured to facilitate user input of the request.

9. The method of claim 8, wherein the user input comprises input representative of a unique identifier associated with the mobile phone device.

10. The method of claim 1, wherein the registering of the mobile phone device with the media content access device comprises:

validating a unique identifier associated with the mobile phone device; and storing the unique identifier for subsequent access by the media content access device.

11. The method of claim 10, wherein the unique identifier comprises a phone number associated with the mobile phone device.

12. The method of claim 1, embodied as computer-executable instructions on at least one non-transitory computer-readable medium.

13. A method comprising:

detecting, by a media content access device, a registration event broadcast by an additional media content access device across a local area network, the registration event comprising a unique identifier associated with a mobile phone device already registered with the additional media content access device;

automatically registering, by the media content access device, the mobile phone device with the media content access device in accordance with the registration event, the automatic registering configured to enable selective control of the media content access device by the mobile phone device by way of a communication channel included in the local area network; and transmitting, by the media content access device, data representative of an acknowledgement of the automatic registration to the additional media content access device.

14. The method of claim 13, further comprising performing, by the media content access device, at least one operation in accordance with one or more control commands transmitted by the mobile phone device by way of the communication channel.

15. The method of claim 13, wherein the registration event is encrypted and wherein the method further comprises decrypting, by the media content access device, the encrypted registration event prior to automatically registering the mobile phone device with the media content access device.

16. The method of claim 13, embodied as computer-executable instructions on at least one non-transitory computer-readable medium.

17. A method comprising:

broadcasting, by a media content access device, a registration information request command across a local area network in response to the media content access device entering an active state after being in an inactive state;

receiving, by the media content access device in response to the registration information request command, a registration event from an additional media content access device already registered with a mobile phone device; and automatically registering, by the media content access device, the mobile phone device with the media content access device in accordance with the registration event, the automatic registering configured to enable selective control of the media content access device by the mobile phone device by way of a communication channel included in the local area network.

18. The method of claim 17, further comprising performing, by the media content access device, at least one operation in accordance with one or more control commands transmitted by the mobile phone device by way of the communication channel.

19. The method of claim 17, embodied as computer-executable instructions on at least one non-transitory computer-readable medium.

20. A media content access device comprising:

a monitoring facility configured to detect a request provided by a mobile phone device to register the mobile phone device with the media content access device; and a registration facility communicatively coupled to the monitoring facility and configured to register the mobile phone device with the media content access device in response to the detected request, the registration configured to enable selective control of the media content access device by the mobile phone device by way of a communication channel included in a local area network, and automatically register the mobile phone device with one or more additional media content access devices within the local area network, the automatic registration configured to enable selective control of the one or more additional media content access devices by the mobile phone device by way of one or more additional communication channels included in the local area network.

21. The system of claim 20, wherein the registration facility is configured to automatically register the mobile phone device with the one or more additional media content access devices by:

broadcasting a registration event across the local area network, the registration event comprising a unique identifier associated with the mobile phone device; and receiving an acknowledgement from a particular media content access device included in the one or more additional media content access devices and that is active at a time of the broadcasting of the registration event, the acknowledgement comprising an acknowledgement of a registration of the mobile phone device with the particular media content access device based on the registration event.

22. The system of claim 20, wherein the registration facility is configured to automatically register the mobile phone device with the one or more additional media content access devices by:
- broadcasting a registration event across the local area network, the registration event comprising a unique identifier associated with the mobile phone device; and
- detecting a registration information request command transmitted by a particular media content access device included in the one or more additional media content access devices and that is inactive at a time of the broadcasting of the registration event, the registration information request command being transmitted by the particular media content access device in response to the particular media content access device becoming active; and
- transmitting the registration event to the particular media content access device in response to the detecting of the registration information request command.

* * * * *